UNITED STATES PATENT OFFICE.

LEOPOLD RAMSEL, OF BALTIMORE, MARYLAND.

PROCESS OF PRODUCING CARAMEL-MALT.

SPECIFICATION forming part of Letters Patent No. 421,431, dated February 18, 1890.

Application filed January 22, 1889. Serial No. 297,206. (No specimens.)

*To all whom it may concern:*

Be it known that I, LEOPOLD RAMSEL, a citizen of the United States, residing at Baltimore, in the State of Maryland, have invented certain new and useful Improvements in Processes of Producing Caramel-Malt; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in the manufacture of caramel or color malt, and the object of the invention is to produce a caramel-malt with which beer or other malt liquors can be colored to any desired color and at the same time to prevent the beer acquiring the bitter taste obtained from the ordinary color-malt now employed.

As is well known to brewers and others skilled in the art, it is very desirable to produce a caramel or color malt which is entirely free from the bitter qualities it now possesses, and it is also well known that the starch-flour of the ordinary malt requires a very high degree of temperature for its caramelization, and is always bitter, while the malt-sugar will become caramelized at a very low temperature, and is sweet. As, however, the malt particles will easily become burnt at the high temperature now required for its production, it is impossible to prevent the color-malt made by the processes now employed from acquiring the bitter and objectionable qualities, and to prevent this and produce a sweet color-malt my invention consists in the following process: The malt shall sugarize by its own power in its unhulled condition, and it shall namely so change itself that it shall be converted into a dissoluble substance, easily colored at a low temperature, and thus the objectionable qualities acquired during the roasting process are obviated. For this purpose in my process the malt to be used for the production of caramel or color malt is first placed in water added in such quantity that the water will cover the malt, and a larger quantity of malt requiring more water and a less quantity of malt less water, and so that the caramel of the malt-grains is converted into a semi-fluid state and the body of the flour is so softened that they so act on each other as to produce sugarization. The fluid is applied to the malt in such manner that it will be submerged for about twenty-four hours, whereby said malt will absorb about one-half of its own weight of water. The water is then withdrawn and water of about 200° to 210° of temperature (Fahrenheit) is at once admitted to the malt, so as to cover the entire quantity, and then steam is permitted to enter until a temperature of about from 155° to 165° is obtained. The malt is then allowed to remain in a quiescent state for about two or three hours for the purpose of sugarization, and the hot water is thus drained from the malt. It is then deprived of its dampness in the malt-driers, so as to be almost dry, to prevent burning, and is finally roasted at a very low temperature.

The color-malt produced by this process does not consist of overroasted starch-flour in its interior, but of burnt sugar, and it has not therefore the bitter qualities possessed by the ordinary color-malt now in use. Moreover, the ordinary color-malt imparts to the caramel only the coloring substance, while the color-malt prepared according to my process serves not only for coloring purposes, but adds its entire extracts or contents to the formation of the caramel, and is therefore better adapted for brewing purposes, as well as more economical, and of very great benefit and value.

I am aware of the preparation of malt and fabrication of beer described in Thausig, *et al.*, Philadelphia, 1882, pages 330-332. I am also aware of the German patent, No. 43,641, to Haumüller, dated May 25, 1888, and disclaim the processes therein described. In these cases and in all processes known to brewers the malt will become perfectly black and burnt, also bitter, while in my process the malt will become sweet and retain its normal color. This is mainly done by submerging the malt in water and then heating it to a certain temperature and finally drying it in the kilns.

Having thus described my invention, what I claim is—

The process herein described of producing caramel or color malt, consisting in first submerging the ordinary malt in water, then withdrawing said water and adding water of a high temperature, then admitting steam until a temperature of about 160° is obtained; then permitting it to sugarize for a short time, next depriving it of its moisture, and finally roasting it at a low temperature, all as specified.

In testimony whereof I affix my signature in presence of two witnesses.

LEOPOLD RAMSEL.

Witnesses:
 T. C. BRECHT,
 M. P. CALLAN.